US012750212B2

(12) United States Patent
Cheng et al.

(10) Patent No.: US 12,750,212 B2
(45) Date of Patent: Sep. 29, 2026

(54) CRYPTO-MATERIAL MANAGEMENT FOR TOKENIZATION

(71) Applicant: Capital One Services, LLC, McLean, VA (US)

(72) Inventors: Hao Cheng, Oakton, VA (US); Rohit Joshi, Glen Allen, VA (US); Kevin Boutarel, Ashburn, VA (US); Andrei-Bogdan Lucescu, Magnolia, TX (US); Sunil Phutela, Chantilly, VA (US)

(73) Assignee: Capital One Services, LLC, McLean, VA (US)

( * ) Notice: Subject to any disclaimer, the term of this patent is extended or adjusted under 35 U.S.C. 154(b) by 192 days.

(21) Appl. No.: 18/823,136

(22) Filed: Sep. 3, 2024

(65) Prior Publication Data

US 2026/0067073 A1 Mar. 5, 2026

(51) Int. Cl.
*H04L 9/08* (2006.01)

(52) U.S. Cl.
CPC .................................. *H04L 9/0861* (2013.01)

(58) Field of Classification Search
CPC .................................................... H04L 9/0861
See application file for complete search history.

(56) References Cited

U.S. PATENT DOCUMENTS

| | | | | |
|---|---|---|---|---|
| 7,318,235 | B2 * | 1/2008 | Grawrock | G06Q 20/367 380/278 |
| 9,887,836 | B1 * | 2/2018 | Roth | H04L 9/088 |
| 10,050,780 | B2 | 8/2018 | Oliver et al. | |
| 10,211,977 | B1 * | 2/2019 | Roth | H04L 9/3234 |
| 10,410,210 | B1 * | 9/2019 | Solis | G06Q 20/20 |
| 11,240,023 | B1 * | 2/2022 | Donlan | H04L 9/088 |
| 2016/0283723 | A1 * | 9/2016 | Roth | H04L 9/0897 |
| 2018/0189502 | A1 * | 7/2018 | Kumar | H04L 9/0863 |

(Continued)

FOREIGN PATENT DOCUMENTS

WO WO-2016160597 A1 * 10/2016 ......... G06F 21/6218

OTHER PUBLICATIONS

Nov. 26, 2025—(WO) International Search Report and Written Opinion—App No. PCT/US2025/041278.

*Primary Examiner* — Darshan I Dhruv
(74) *Attorney, Agent, or Firm* — Banner & Witcoff, Ltd.

(57) ABSTRACT

Systems, methods, and apparatuses are described for crypto-material life-cycle management for tokenization and/or encryption. A computing device may generate cryptographic material comprising one or more blobs. Each of the blobs may be usable for encryption and/or tokenization for different field types and via various different encryption/tokenization algorithms. Multiple cryptographic blobs might be generated in advance for the same field type/algorithm, such that the cryptographic blobs are quickly available for use. In response to computing device requests for such cryptographic blobs, a cryptographic blob for a particular field/algorithm may be identified and transmitted. The cryptographic material may be refreshed periodically, when most and/or all of the cryptographic blobs are used up, or upon detection of a security breach. The cryptographic material may be appended based on new fields and/or algorithms such that the cryptographic material is backwards- and forwards-compatible.

20 Claims, 5 Drawing Sheets

(56) References Cited

U.S. PATENT DOCUMENTS

2023/0131348 A1* 4/2023 Landerholm ......... H04L 9/0877
713/168
2023/0325820 A1* 10/2023 Battula ................ G06Q 20/385
705/67
2024/0086931 A1* 3/2024 Asefi .................. G06Q 20/3821
2024/0333497 A1* 10/2024 Khan .................... H04L 9/0877
2026/0024031 A1* 1/2026 Fisher .............. G06Q 10/06311

* cited by examiner

CRYPTO-MATERIAL MANAGEMENT FOR TOKENIZATION

FIELD OF USE

Aspects of the disclosure relate generally to data security. More particularly, aspects described herein describe a process for managing and securing cryptographic data used in the process of encryption and/or tokenization.

BACKGROUND

Organizations often need to store private data (e.g., credit card numbers, social security numbers) in compliance with various standards, such as the Payment Card Industry Data Security Standard (PCI DSS). One approach to securely storing such private data in compliance with PCI DSS is tokenization. Tokenization replaces any data, including sensitive data, with a token. Many tokenization algorithms are based on data, such as so-called cryptographic blobs, which act as a sort of key which may be used to tokenize and/or detokenize data. Tokenization can be reversible (meaning that reversible tokens are mapped to data in a way such that, with the correct cryptographic blob, the reversible tokens can be processed using a detokenization algorithm to return the original data) or irreversible (meaning that, whether or not the cryptographic blob is possessed, it is impossible for any party to recreate the original value from an irreversible token). The approach taken to generate such tokens is quite different: while a reversible token might be generated using an algorithm with various steps (e.g., replacing characters with other characters based on a table and/or all or portions of the cryptographic blob) that can be reversed (e.g., performing those steps in reverse), irreversible tokens are often generated using one-way algorithms.

Because cryptographic blobs can be integral to the process of encryption/tokenization, the management and security of those cryptographic blobs can be essential. For example, if overly simplistic cryptographic blobs are used, then they might be guessable and thus risk the security of a tokenization scheme.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to crypto-material lifecycle management. This may involve a process whereby a third-party server (e.g., as part of a head-end tokenization management service) manages cryptographic material comprising one or more blobs which may be usable in the process of tokenizing and/or encrypting data fields. The third-party server may create such cryptographic material so by generating a large quantity of cryptographic blobs in advance, such that it can quickly provide such cryptographic blobs when asked. Moreover, the cryptographic material may update the blobs over time and/or may provide various different blobs for different field types and/or tokenization/encryption algorithms. Along those lines, the cryptographic material maintained by the third-party server may comprise a variety of different cryptographic blobs for different fields/algorithms, and additional blobs may be appended to the cryptographic material after a period of time has elapsed, after a security risk is detected, and/or to account or new fields/algorithms. This advantageously might mean that the third-party server is ready to provide such cryptographic blobs when asked (even if they are computationally complex to generate), and also might mean that the third-party server maintains cryptographic material that is backwards-compatible (because it may maintain cryptographic blobs for older/legacy fields/algorithms) and forwards-compatible (because additional cryptographic blobs may be easily appended to account for newer fields/algorithms). The server might also regularly (e.g., periodically, based on some key rotation policy) generate new cryptographic blobs, meaning that it is always ready and waiting for requests for such blobs. Furthermore, the entire structure of such a process (a third-party server managing cryptographic material, with blobs selectively provided to requestors, and with blobs periodically updated over time and/or based on updates to fields/algorithms) may have security advantages: because the third-party server may maintain the cryptographic material and may provide cryptographic blobs only upon request, then recipients of those blobs can perform encryption/tokenization themselves, meaning that sensitive data need not be transmitted over a network. Instead, at most, cryptographic blobs (which can be depreciated, replaced, obfuscated in memory of a recipient device, or the like) are transmitted over the network.

More particularly, a computing device may generate cryptographic material comprising a header indicating parameters used to generate cryptographic blobs, a first cryptographic blob for a first field type and a first tokenization algorithm, and/or a second cryptographic blob for the first field type and the first tokenization algorithm. The computing device may then receive, from a second computing device, a first cryptographic blob request that indicates a tokenization algorithm used by the second computing device and the first field type. The computing device may select, from the cryptographic material and based on the first cryptographic blob request, the first cryptographic blob. Then, the computing device may send, to the second computing device and based on authenticating the second computing device, the selected first cryptographic blob. As part of sending that cryptographic blob, the computing device may cause obfuscation, in a memory of a recipient device, of the selected first cryptographic blob. The computing device may later receive, from the second computing device, a second cryptographic blob request that indicates the tokenization algorithm used by the second computing device and the first field type. Then, the computing device may select, from the cryptographic material and based on the second cryptographic blob request, the second cryptographic blob and send, to the second computing device and based on authenticating the second computing device, the selected second cryptographic blob. After sending the selected second cryptographic blob, the computing device may generate, based on the parameters used to generate the cryptographic blobs, new cryptographic material comprising the header and at least one third cryptographic blob for the first field type and the first tokenization algorithm.

The cryptographic material might comprise a variety of cryptographic blobs for different field types. For example, the cryptographic material may comprise a fourth cryptographic blob for a second field type and the first tokenization algorithm. In such an example, the computing device may receive, from the second computing device, a third cryptographic blob request that indicates the tokenization algorithm used by the second computing device and the second field type. Then, the computing device may select, from the cryptographic material and based on the third cryptographic blob request, the fourth cryptographic blob and send, to the second computing device and based on authenticating the second computing device, the selected fourth cryptographic blob.

The cryptographic material may be appended on a periodic basis (e.g., based on a key rotation policy), to account for new types of data fields, and/or to account for new/updated tokenization algorithms. For example, based on a key rotation policy, the computing device may append, to the cryptographic material, one or more fourth cryptographic blobs for the first field type and the first tokenization algorithm. As another example, the computing device may append, to the cryptographic material, one or more fourth cryptographic blobs for the first field type and a second tokenization algorithm. In the latter example, the computing device may receive, from the second computing device, a third cryptographic blob request that indicates the second tokenization algorithm and the first field type, select, from the appended cryptographic material and based on the third cryptographic blob request, at least one of the one or more fourth cryptographic blobs, and then send, to the second computing device and based on authenticating the second computing device, the selected at least one of the one or more fourth cryptographic blobs.

As indicate above, the cryptographic material may be periodically refreshed (e.g., based on a key rotation policy). For example, based on determining that an age of the new cryptographic material satisfies a threshold (e.g., one established based on a key rotation policy), the computing device may generate, based on the parameters used to generate the cryptographic blobs, second new cryptographic material comprising the header and at least one fourth cryptographic blob for the first field type and the first tokenization algorithm.

In the event of a security breach, cryptographic materials may be refreshed. For example, based on receiving data indicating a security breach associated with the second computing device, the computing device may generate, based on new parameters, second new cryptographic material comprising a second header indicating the new parameters and at least one fourth cryptographic blob for the first field type and the first tokenization algorithm.

The header of the cryptographic material may be usable to describe information about the cryptographic material, including the nature of the cryptographic blobs. For example, the header may further indicate a version of a schema of the cryptographic material, an encoding of the cryptographic material, a quantity of fields supported by the cryptographic material, and a quantity of versions of the tokenization algorithm supported by the cryptographic material.

Corresponding methods, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
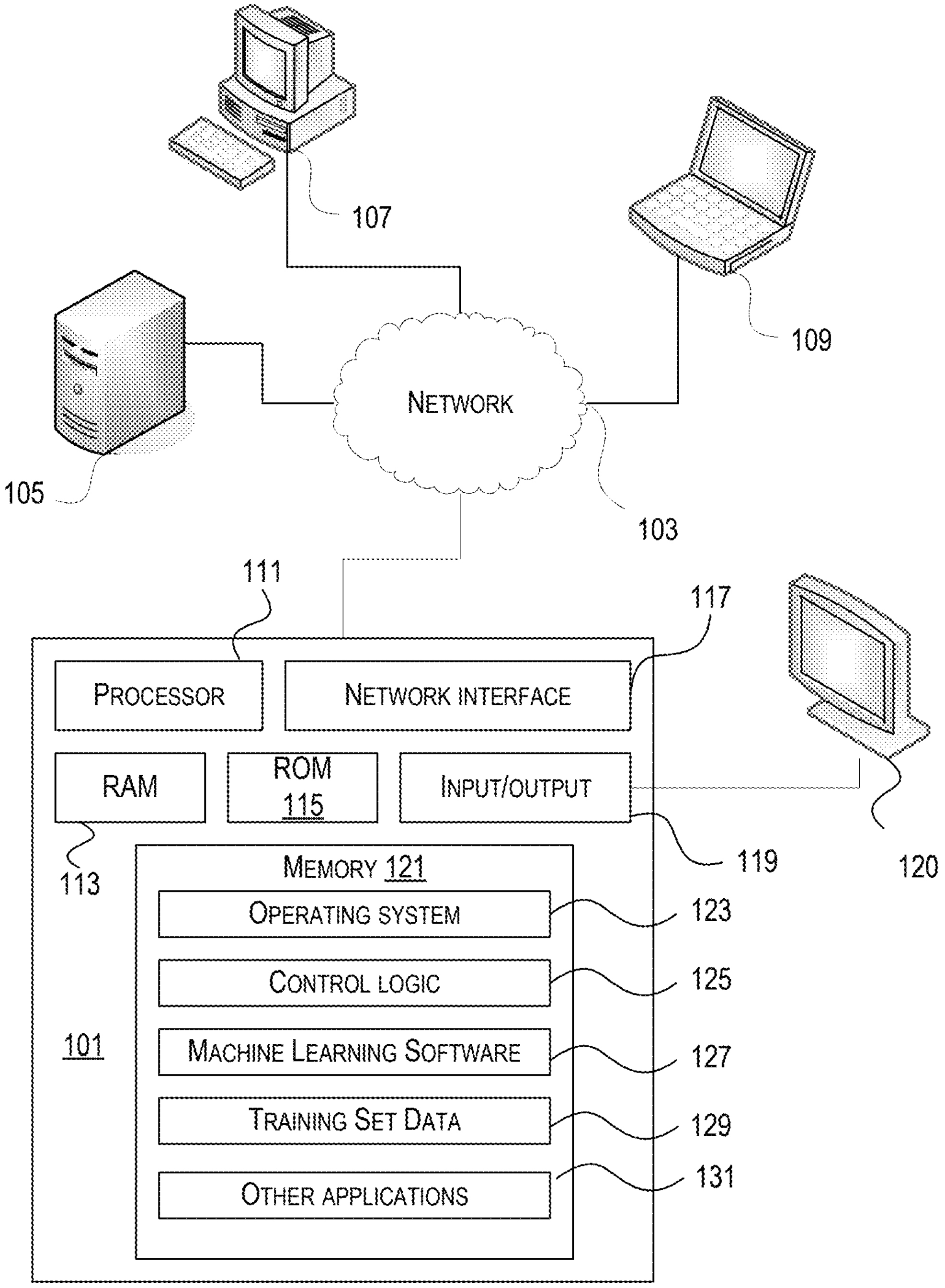
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, an organization (e.g., a third-party tokenization service provider) may maintain an encryption/tokenization scheme for a variety of consumers. As part of this scheme, the organization's servers may transmit, to customer devices, information such as encryption/tokenization algorithm information (e.g., instructions on how to perform tokenization/encryption) as well as, for data to be encrypted/tokenized, cryptographic blobs which may be used by the algorithm to perform the encryption/tokenization. In this manner, while the organization manages the tokenization/encryption, the actual process of tokenization/encryption is performed locally, by the customer's own devices. This has significant data security benefits, as it means that the data itself (e.g., in plaintext format) is not transmitted over a network in a manner that might be vulnerable to compromise. As part of this scheme, the organization's servers may maintain cryptographic material comprising a variety of cryptographic blobs, with those blobs usable to encrypt different data of different types and, if desired, using different algorithms (e.g., different versions of a tokenization/encryption algorithm). For instance, the server might generate hundreds of different blobs, with some subsets of those blobs usable for a particular field type and/or algorithm, and other subsets usable for different field types and/or different algorithms.

As will be detailed further below, one advantage of this process is that it significantly improves the efficiency of the tokenization/encryption process. By generating cryptographic blobs and only providing them at the time of tokenization/encryption, unnecessarily large tables of tokenization/encryption values need not be stored. Indeed, particularly in the case of irreversible tokenization/encryption, cryptographic blobs need only be maintained until they are used, and can be refreshed periodically (e.g., based on an age of the cryptographic blob(s), based on a key rotation policy). Moreover, by generating a large quantity of cryptographic blobs in advance, delays associated with the generation of such blobs (e.g., the delay required to generate such blobs using a computationally intensive process) can be incurred in advance, making the actual tokenization process go significantly more quickly. In fact, especially in cases where the generation of cryptographic blobs is computationally intensive, this process may mean that the process is performed more quickly on a relatively more computationally powerful server, rather than locally on a consumer's device (which could be somewhat less computationally powerful).

In turn, aspects described herein improve the functioning of computers by improving data and network security. Tokenization and encryption are valuable approaches for securing private data stored by computing devices, but these processes are computationally complex, require as much security as possible, and can be cumbersome to implement (particularly in view of the addition of new types of data fields, the evolving nature of tokenization/encryption algorithms, and the like). Processes described herein improve the manner in which computers (and, in particular, multiple computers-one computing device, such as a third-party management server, and another computing device, such as a customer computing device) can perform such encryption/tokenization, particularly in a manner which is backwards- and forwards-compatible, secure, reactive to possible security breaches, relatively quick, and generally efficient. No arrangement of humans could perform this process, whether mentally or otherwise at least because the process is fundamentally rooted in computing processes (tokenization/encryption), because the process relies on a particular arrangement of multiple computing devices, and because the process entails a particular structuring of computer data.

Another benefit of the approaches described herein is that it significantly simplifies the process of encryption/tokenization, particularly in the case where a third party provides an encryption/tokenization service to various external user. In the processes described herein, a user need only be associated with a single set of cryptographic materials which might contain all cryptographic blobs necessary for forwards- and backwards-compatibility with their encryption/tokenization algorithm(s). In other words, a customer of a third-party encryption/tokenization platform need only be associated with one set of cryptographic material (e.g., one cryptographic material ID) and a field secret need only associate with a particular cryptographic blob offset. The process of managing such cryptographic material is also made straightforward: when cryptographic material is refreshed, such refreshing might be performed by cloning current cryptographic material and appending new items (e.g., new cryptographic blobs, new information to the header). Indeed, this may allow the updating of only the cryptographic material identifier, rather than multiple field configurations.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
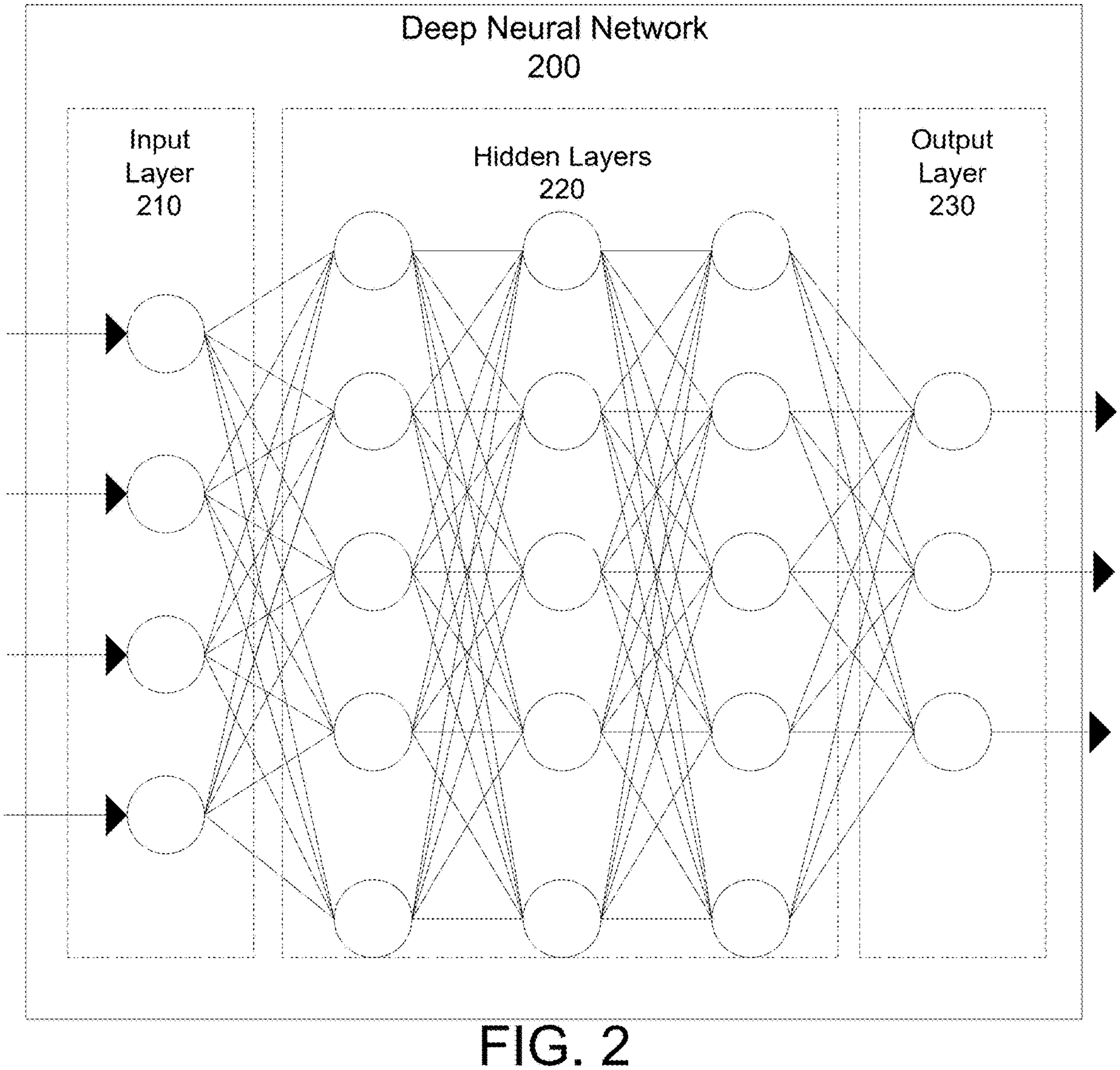
FIG. 2 depicts an example deep neural network architecture for a model according to one or more aspects of the disclosure.

FIG. 2 illustrates an example of a deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network architecture 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
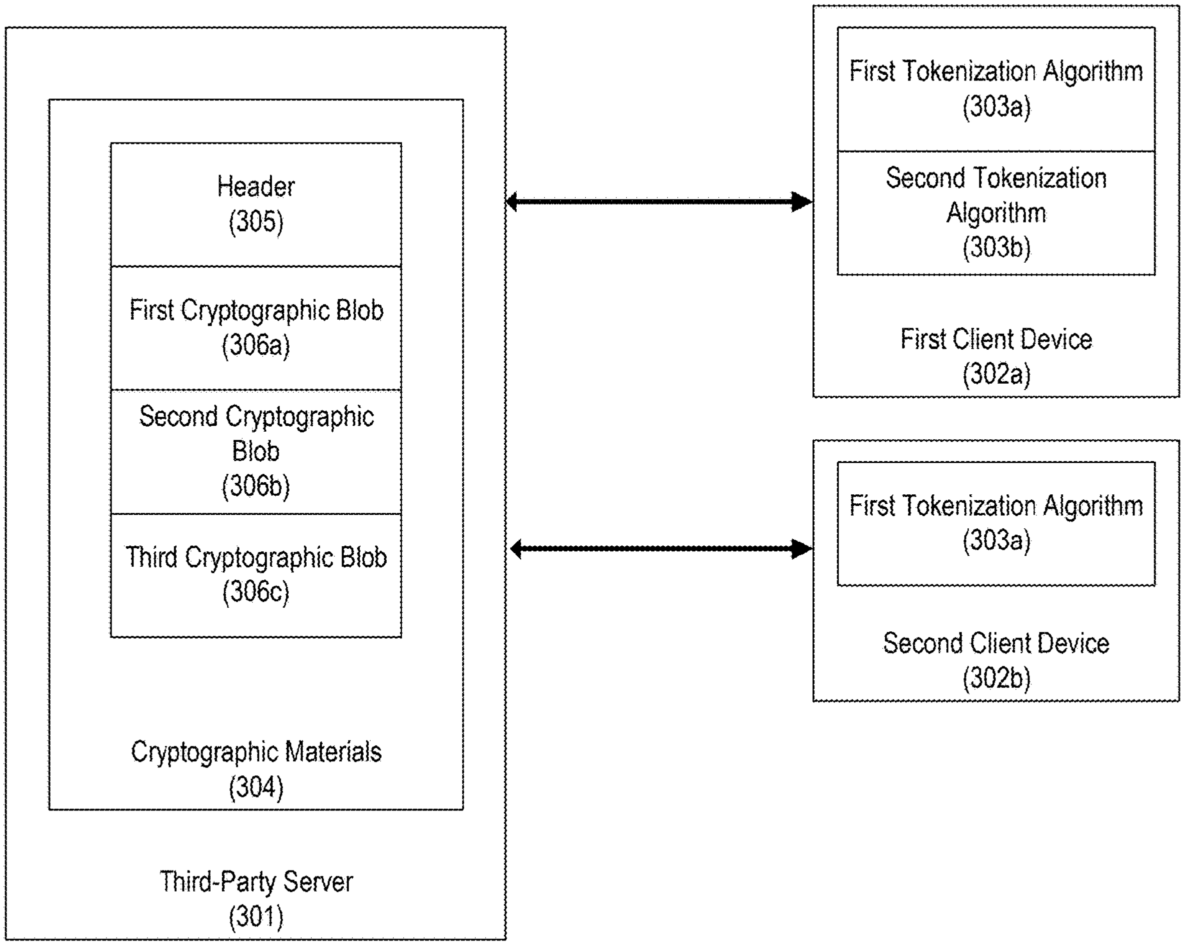
FIG. 3 depicts an illustrative system including a third-party server and client devices.

FIG. 3 depicts an illustrative system comprising a third-party server 301 communicatively coupled to a first client device 302*a* and a second client device 302*b*. Any of such devices may be a computing device, such as any of the devices discussed with respect to FIG. 1. Such devices may be communicatively coupled via, for example, a network such as the Internet.

The first client device 302*a* and the second client device 302*b* are shown as maintaining one or more tokenization algorithms. Specifically, the first client device 302*a* is depicted as maintaining a first tokenization algorithm 303*a* and a second tokenization algorithm 303*b*, whereas the second client device 302*b* is shown as maintaining the first tokenization algorithm 303*a*. Client devices, such as the first client device 302*a* and the second client device 302*b*, may maintain a variety of algorithms (e.g., encryption algorithms, tokenization algorithms, compression algorithms) which may use cryptographic blobs to process data fields. For example, the first tokenization algorithm 303*a* may comprise a first version of a tokenization algorithm that uses cryptographic blobs to generate tokenized versions of input data, whereas the second tokenization algorithm may comprise a second version of a tokenization algorithm that uses cryptographic blobs to generate different tokenized versions of input data. Such algorithms may have been received from the third-party server 301. For example, the third-party server 301 may provide client devices various algorithms, and the client devices may then use those algorithms along with cryptographic blobs (which may also be received from the third-party server 301) to process data.

The third-party server 301 may generate and/or maintain cryptographic materials 304, which may comprise one or more cryptographic blobs. For example, FIG. 3 depicts the cryptographic materials 304 comprising a header 305, a first cryptographic blob 306*a*, a second cryptographic blob 306*b*, and a third cryptographic blob 306*c*. The third-party server 301 may securely and temporarily store the cryptographic materials 304 by, for example, storing them in temporary memory and in an encrypted and/or otherwise protected format. The header 305 of the cryptographic materials 304 may comprise metadata relating to the cryptographic materials 304, such as a version of the cryptographic materials 304, time(s) when the cryptographic materials 304 (or a subset thereof) were generated, data fields supported by the cryptographic materials 304, or the like. The third-party server 301 may be configured to periodically refresh (e.g., append to) the cryptographic materials 304. For example, based on a date/time field in the header 305 of the cryptographic materials 304 satisfying (e.g., exceeding) a threshold, the computing device may append, to the cryptographic materials 304, additional cryptographic blobs that supersede past cryptographic blobs. Such a threshold might be established based on a key rotation policy, such as a key rotation policy corresponding to a key used to generate one or more cryptographic blobs.

Cryptographic blobs, such as the first cryptographic blob 306*a*, the second cryptographic blob 306*b*, and the third cryptographic blob 306*c*, may comprise any data element (e.g., a string, a hash, a series of numbers, a file) usable by a tokenization/encryption algorithm, such as the first tokenization algorithm 303*a* or the second tokenization algorithm 303*b*. Generally, the exact processes involved in a tokenization/encryption algorithm are kept secret, as such secrecy aids in the security of the overall tokenization/encryption process. That said, many such algorithms may use cryptographic blobs (in a variety of formats) to generate encrypted/tokenized versions of input data. As such, the exact format of a cryptographic blob may vary based on the field to be processed, the algorithm using the cryptographic blob, or the like. For instance, an algorithm may use one format of cryptographic blob to tokenize a first data field, but might use an entirely different format of cryptographic blob to tokenize a second data field. As another example, one algorithm may use one format of cryptographic blob to tokenize a data field, but a different algorithm may use an entirely different format of cryptographic blob to tokenize the same data field.

In some cases, tokenization algorithms, such as the first tokenization algorithm 303*a* and/or the second tokenization algorithm 303*b*, may rely on and/or otherwise comprise machine learning as described above with respect to FIG. 2. For example, a tokenization algorithm may use a machine learning model implemented via an artificial neural network to perform a tokenization process. As another example, an encryption algorithm may use machine learning model implemented via an artificial neural network to perform all or portions of an encryption process.

Figure 4:
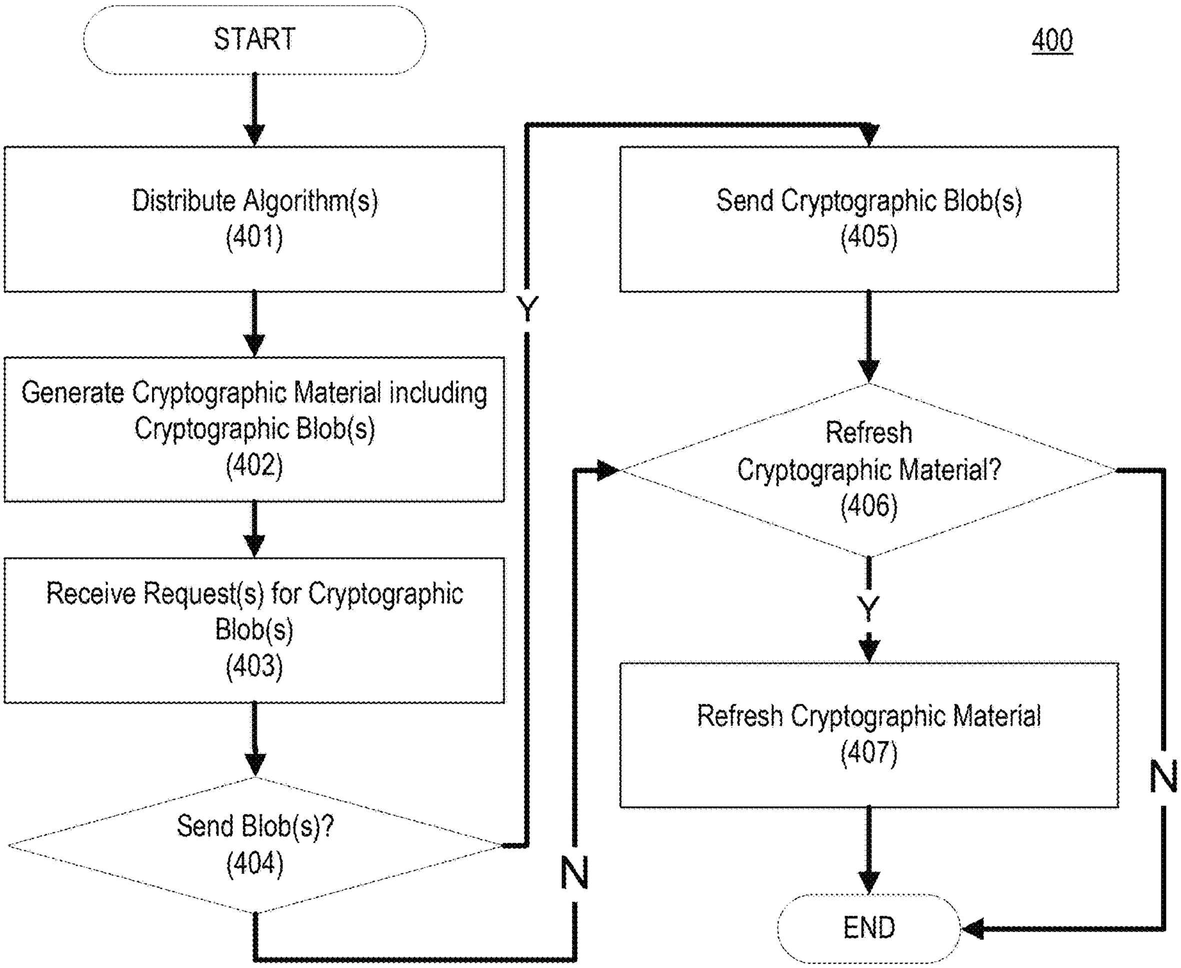
FIG. 4 depicts steps of a method for crypto-material life-cycle management.

FIG. 4 depicts a method 400 comprising steps for crypto-material life-cycle management. The method 400 may be performed by a computing device, such as any one of the devices described with respect to FIG. 1, FIG. 2 and/or FIG. 3, such as the third-party server 301, the first client device 302*a*, and/or the second client device 302*b*. The steps shown in FIG. 4 are illustrative, and may be re-arranged, omitted, and/or modified as desired. A computing device may comprise one or more processors and memory storing instructions that, when executed by the one or more processors, cause the performance of one or more of the steps depicted in FIG. 4. One or more non-transitory computer-readable media may store instructions that, when executed, cause the performance of one or more of the steps depicted in FIG. 4.

In step 401, a computing device may distribute algorithms. For example, the computing device may transmit, to one or more client devices (such as the first client device 302*a* and/or the second client device 302*b*), one or more algorithms (such as tokenization algorithms like the first tokenization algorithm 303*a* and/or the second tokenization algorithm 330*b*). Such a transmission may be via secure channels, such as an encrypted tunnel. Additionally and/or alternatively, to aid in security, the algorithms may be distributed physically and via specialized hardware (e.g., cryptographic processors, plug-in devices). In general, a variety of different methods may be taken to ensure that, to the extent practicable, the algorithm(s) provided to various users are kept as secret as possible. Indeed, one advantage of the present application is that, in some circumstances, only cryptographic blobs are transmitted, rather than the data being tokenized/encrypted and rather than the algorithm(s) themselves.

In step 402, the computing device may generate cryptographic material that includes one or more cryptographic blobs. This process may comprise generating cryptographic material comprising a header that describes the cryptographic material (e.g., parameters used to generate the cryptographic material) and one or more cryptographic blobs for one or more different field types and/or algorithms. For example, the computing device may generate cryptographic material comprising a header indicating parameters used to generate cryptographic blobs, a first cryptographic blob for a first field type and a first tokenization algorithm, and/or a second cryptographic blob for the first field type and the first tokenization algorithm.

Cryptographic material, including the one or more cryptographic blobs therein, may be periodically updated. For example, the computing device may generate the cryptographic material by copying previous cryptographic material, generating new cryptographic blobs, and appending those new cryptographic blobs to the copied cryptographic material (along with, if desired, appropriate versioning information that indicates that the new cryptographic blobs supersede the previous cryptographic blobs). Such an update process might be performed periodically, such as based on a time period defined by a key rotation policy. This means that cryptographic material may comprise, for the same algorithm/field/user, multiple different cryptographic blobs, with the latest cryptographic blob being usable and previous cryptographic blobs being stored for legacy purposes. One advantage of such a circumstance is that it allows future cryptographic blobs to be based on (e.g., depend from) past cryptographic blobs, much like the operation of a blockchain.

Cryptographic material, including cryptographic blobs, may be generated based on parameters. Such parameters might specify the data field(s) to be supported, the algorithm(s) to be supported, the number of cryptographic blobs to generate, the algorithm(s) used to generate such cryptographic blobs, and the like. Such parameters may be changed over time to, for example, account for additional algorithms/data fields, to modify the number of cryptographic blobs generated, to modify the process with which those cryptographic blobs are generated, or the like.

Because cryptographic blobs may vary in format and volume, the particular processes for generating a cryptographic blob may vary. Some cryptographic blobs may be generated using one or more algorithms and based on some other data (e.g., a key, a certificate, past cryptographic blobs), whereas others might be generated randomly. As such, the time required to generate one or more cryptographic blobs may vary based on implementation.

As one example of how cryptographic material may be generated, the computing device may use a True Random Number Generator service to retrieve a crypto-random data set and create one or more cryptographic blobs. A header may then be appended to the cryptographic blob(s), and the entire data set may be signed (with a signature appended to the combined cryptographic blobs and header). That entire data set may then be encrypted, and an additional header (e.g., a metadata header) may be appended to that encrypted data. The resulting data may then comprise the cryptographic material, which may then be saved to persistent storage.

In some circumstances, it may be advantageous for the computing device to, when generating the cryptographic material, generate a large quantity of cryptographic blobs. Doing so will allow to have numerous such cryptographic blobs available in reserve such that, upon request, the computing device can more quickly identify an appropriate cryptographic blob and provide it to a requestor computing device. This advantage might be particularly realized where the processes used to generate cryptographic blobs are computationally complex, as it might thereby frontload such processing time to before a request for a cryptographic blob is received.

In step 403, the computing device may receive one or more requests for one or more cryptographic blobs. Such requests might be received from other computing devices, such as the first client device 302*a* and/or the second client device 302*b*. Moreover, such requests may indicate which algorithm(s) and/or field type(s) the requested cryptographic blob will be used for. For example, the computing device may receive, from a second computing device, a first cryptographic blob request that indicates a tokenization algorithm used by the second computing device and/or the first field type. Because computing devices may process different data having the same field type and using the same algorithm, computing devices may send multiple requests for cryptographic blobs for the same field type and/or algorithm. For example, the computing device may receive, from the second computing device, a second cryptographic blob request that indicates the tokenization algorithm used by the second computing device and/or the first field type. Indeed, this process might be repeated often, as computing devices such as the first client device 302*a* and/or the second client device 302*b* may have a large quantity of data having the same field type to tokenize/encrypt using the same algorithm.

In step 404, the computing device may determine whether to send one or more cryptographic blobs. This process may comprise identifying both whether an appropriate cryptographic blob exists and/or whether the requesting computing device is entitled to receive such a cryptographic blob. For example, the computing device may search, in the cryptographic material and based on the first cryptographic blob request, for an appropriate cryptographic blob (e.g., a cryptographic blob appropriate for the field type and/or algorithm indicated in the request) and, if an appropriate cryptographic blob is not available, may decide to not send the cryptographic blob. If the computing device decides to send the one or more cryptographic blobs, the method 400 proceeds to step 405. Otherwise, the computing device proceeds to step 406.

The computing device may decide to send one or more cryptographic blobs based on authentication of a requesting computing device. A prerequisite to deciding to send on. Such authentication may be performed by validating authentication credentials (e.g., a username, password, certificate, key) associated with a requestor device. Such authentication may comprise use of a trained machine learning model. For instance, a machine learning model (such as that which might be implemented by the artificial neural network described above with respect to FIG. 2) may be trained using training data comprising a history of cryptographic blob requests. Such training data may be tagged based on whether the cryptographic blob request should or should not be allowed. In turn, the trained machine learning model may be trained to determine, based on input data comprising a cryptographic blob request (e.g., a request received as part of step 403), whether to grant the request.

In step 405, and based on deciding to send the one or more cryptographic blobs in step 404, the computing device may send the one or more cryptographic blobs. For example, the computing device may select, from the cryptographic material and based on the first cryptographic blob request, the first cryptographic blob and send, to the second computing device and based on authenticating the second computing device, the selected first cryptographic blob. The computing device may perform this step by, for example, transmitting the one or more cryptographic blobs over a network, such as the Internet. With that said, because security may be important for the purposes of maintaining the security of an encryption/tokenization process, the one or more cryptographic blobs may be transmitted via, for instance, a secure tunnel.

As part of sending the one or more cryptographic blobs, the computing device may cause obfuscation of a cryptographic blob in a memory of a recipient device. As indicated above, the security of cryptographic blobs may be important to aid in the security of an overall encryption/tokenization process. In turn, it may be desirable to obfuscate a cryptographic blob while it is stored in memory such that, even if a malicious actor gained access to the memory of a device (e.g., the memory of the first client device 302*a* and/or the memory of the second client device 302*b*), the particular identity of a given cryptographic blob might not be known. To perform such obfuscation, the computing device may be configured to cause a recipient device (e.g., the device storing the received cryptographic blob in memory) to scramble, break up, and/or otherwise mix all or portions of the cryptographic blob while it is maintained in memory. For example, a cryptographic blob might be stored in the memory of a recipient device in reverse order, such that the cryptographic blob "ABCD" is stored in memory as "DCBA." The process described above with respect to step 403 through step 405 may be repeated for various different field types and/or algorithms. Indeed, as suggested above, one advantage of the present disclosure is that the cryptographic materials may comprise cryptographic blobs for a wide variety of different field types and/or algorithms, which may allow the cryptographic materials to be both backwards- and forwards-compatible. For example, the cryptographic material may comprise a fourth cryptographic blob for a second field type and the first tokenization algorithm, and the computing device may receive, from the second computing device, a third cryptographic blob request that indicates the tokenization algorithm used by the second computing device and the second field type. In such an example, the computing device may select, from the cryptographic material and based on the third cryptographic blob request, the fourth cryptographic blob and send, to the second computing device and based on authenticating the second computing device, the selected fourth cryptographic blob. As another example, the cryptographic material may comprise a fourth cryptographic blob for the first field type and a second tokenization algorithm, and the computing device may receive, from the second computing device, a third cryptographic blob request that indicates the first field type and the second tokenization algorithm. In such an example, the computing device may select, from the cryptographic material and based on the third cryptographic blob request, the fourth cryptographic blob and send, to the second computing device and based on authenticating the second computing device, the selected fourth cryptographic blob.

Discussion will now turn to how the cryptographic material may be managed, and, in particular, refreshed over time. Although it may be valuable to maintain a large quantity of cryptographic blobs ready-to-go for possible requests, it may be equally valuable to ensure that the cryptographic materials are periodically refreshed. After all, the longer cryptographic materials are stored and unused, the longer those materials have to be potentially acquired by malicious entities. Moreover, periodically updating the cryptographic materials (e.g., to account for new field types, new algorithms, or just to add additional cryptographic blobs) may be desirable to ensure that the cryptographic materials are ready to be provided in response to virtually any authentic cryptographic blob request from client devices like the first client device 302*a* and/or the second client device 302*b*.

In step 406, the computing device may determine whether the cryptographic material should be refreshed. Circumstances where the cryptographic material should be refreshed may include, as will be detailed below, when the cryptographic material's age satisfies a threshold (e.g., defined by a key rotation policy), when the cryptographic material might have been exposed to a security breach, when the cryptographic material does not support all data fields/algorithms necessary, and/or when the cryptographic material has an insufficient number of cryptographic blobs. If the computing device decides to refresh the cryptographic material, the method 400 proceeds to step 407. Otherwise, the method 400 ends.

The computing device may determine whether the cryptographic material should be refreshed based on an age of the cryptographic material. Cryptographic material may be refreshed (e.g., new cryptographic blobs may be generated) periodically for security reasons, as well as because doing so may benefit from improvements to, for example, the algorithm(s) used to generate cryptographic blobs. In turn, if an age of cryptographic material satisfies a threshold, then the computing device may decide to refresh it. Such a threshold might be based on a key rotation policy, such that, for instance, cryptographic blobs may be re-generated at the same periodicity as a key used to generate those cryptographic blobs is rotated.

The computing device may determine whether the cryptographic material should be refreshed based on evidence of a security breach. Various security services (e.g., internal threat monitoring platforms, firewalls) and external security services (e.g., third party threat awareness services) may report malicious activity with respect to one or more computing devices and/or one or more networks. Upon receipt of such reporting, the computing device may refresh the cryptographic material. This may be the case even if the tokenization/encryption processes involved are not directly implicated.

The computing device may determine whether the cryptographic material should be refreshed based on determining that the cryptographic material does not support all data fields/algorithms necessary. Client devices such as the first client device 302 and/or the second client device **302*b*** may encrypt/tokenize a wide variety of data, such that there may be circumstances where those devices want to encrypt/tokenize new types of data. For example, while a client device might have previously only tokenized user phone numbers, it might later begin to tokenize user last names. Moreover, such client devices might use different algorithms. For example, a client device might use a relatively fast but simplistic tokenization algorithm for tokenizing simple data like user zip codes, but might use a more computationally complex but more secure tokenization algorithm for tokenizing user Social Security numbers. In either circumstance, it may be desirable for the computing device to maintain cryptographic blobs for different data fields and/or different algorithms. In turn, if a computing device identifies that the cryptographic material does not support all desired field types/algorithms, it may decide to refresh the cryptographic material.

The computing device may determine whether the cryptographic material should be refreshed based on determining that the cryptographic material has an insufficient number of cryptographic blobs. There may be circumstances where a number of cryptographic blobs in the cryptographic materials drop beneath a threshold. In such a circumstance, it may be desirable to refresh the cryptographic material to include a sufficient number of cryptographic blobs going forward. In some circumstances, a rate of cryptographic blob use may be determined, and the cryptographic materials may be refreshed based on such a rate. For example, a machine learning model implemented via an artificial neural network (e.g., the artificial neural network described above with respect to FIG. 2) may be trained to predict future cryptographic blob usage based on a history of past cryptographic blob requests. In turn, the machine learning model may be configured to output, based on a recent rate of cryptographic blob requests, an indication of when the cryptographic material should be refreshed. This refreshing process may occur long before the cryptographic material runs out of cryptographic blobs: after all, running out might mean significant delays in responding to cryptographic blob requests.

In step 407, the computing device may refresh the cryptographic material. Refreshing the cryptographic material may comprise generating new cryptographic material. In such a case, expired and/or otherwise unneeded cryptographic blobs need not be discarded (as they might be immutable), but additional cryptographic blobs might be generated and might supersede previous cryptographic blobs. For example, the computing device may generate, after sending the selected second cryptographic blob and based on the parameters used to generate the cryptographic blobs, new cryptographic material comprising the header and at least one third cryptographic blob for the first field type and the first tokenization algorithm. The computing device might append additional cryptographic blobs to existing cryptographic material. For example, the computing device may append, to the cryptographic material, one or more additional cryptographic blobs for the first field type and the first tokenization algorithm. Such one or more additional cryptographic blobs might thereby supersede, as applicable, previous cryptographic blobs for the same field type/tokenization algorithm. For example, cryptographic blobs may be associated with version numbers, with subsequent versions of cryptographic blobs superseding past versions of cryptographic blobs. Whether the computing device entirely replaces the cryptographic material or merely appends to existing cryptographic material may be based on the reasons for refreshing the cryptographic material in the first place. For instance, appending to the cryptographic material may be appropriate when the cryptographic blobs run low; however, appending may be a poor approach in response to a security breach (where, despite the immutability, additional steps might be taken to limit the effect of such a breach).

To provide an example of the above, assume a circumstance where the cryptographic material comprises two cryptographic blobs: one for field type A, and another for field type B. At some point, the cryptographic blob for field type A may become undesirably old—for example, an age associated with the cryptographic blob for field type A may exceed a threshold. In such a circumstance, the cryptographic material may be appended to include a new cryptographic blob for field type A, and that new cryptographic blob might be tagged (e.g., with a version number or similar designation) that it supersedes the previous cryptographic blob for field type A. In that circumstance, the cryptographic material might effectively store two cryptographic blobs for field type A, although only the most recent one might be used.

As indicated above, refreshing the cryptographic material may be based on evidence of a security breach. In such a situation, the generation of new cryptographic blobs may involve generation using new parameters, such as new security keys, so as to avoid possible compromise based on the security breach. In such an example, the computing device may, based on receiving data indicating a security breach associated with the second computing device, generate, based on new parameters, second cryptographic material comprising a second header indicating the new parameters and at least one fourth cryptographic blob for the first field type and the first tokenization algorithm.

As indicated above, refreshing the cryptographic material may be based on an age of the cryptographic material. In such a situation, cryptographic blobs may be re-generated to ensure the newness of the cryptographic blobs. For example, based on determining that an age of cryptographic material satisfies a threshold, the computing device may generate, based on the parameters used to generate the cryptographic blobs, new cryptographic material comprising the header and at least one fourth cryptographic blob for the first field type and the first tokenization algorithm.

Refreshing the cryptographic material may comprise appending, to the cryptographic material, new cryptographic blobs for different field types and/or tokenization algorithms. For example, the computing device may append, to the cryptographic material, one or more fourth cryptographic blobs for the first field type and the first tokenization algorithm, and then tag the fourth cryptographic blobs as being associated with a higher version number than previous cryptographic blobs for the first field type and the first tokenization algorithm. As another example, the computing device may append, to the cryptographic material, one or more fourth cryptographic blobs for the first field type and a second tokenization algorithm. In such an example, the computing device could use the appended cryptographic material to support the second tokenization algorithm in the future. For example, the computing device may then receive, from the second computing device, a third cryptographic blob request that indicates the second tokenization algorithm and the first field type and, in response, select, from the appended cryptographic material and based on the third cryptographic blob request, at least one of the one or more fourth cryptographic blobs and send, to the second computing device and based on authenticating the second computing device, the selected at least one of the one or more fourth cryptographic blobs.

As an example of how additional cryptographic blobs might be appended to cryptographic material, the computing device may retrieve existing cryptographic material (e.g., from memory) and then decrypt that material (if encrypted). Then, the computing device may generate one more additional cryptographic blobs and append those blobs to the decrypted data. The header(s) (and, e.g., the manifest of the headers describing the number of blobs and/or the version number of the cryptographic material) may be modified appropriately. Then, the computing device may re-encrypt and store the newly-appended cryptographic material.

Figure 5:
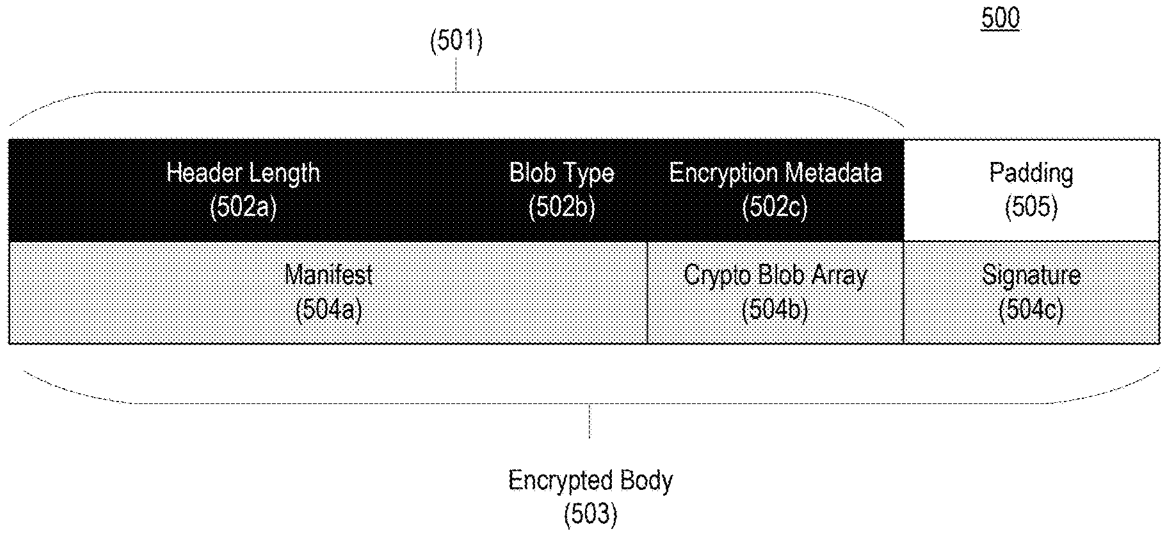
FIG. 5 depicts an illustrative cryptographic material layout.

FIG. 5 depicts an illustrative cryptographic material layout 500. This layout may be a binary layout representing how binary data of a cryptographic blob may be transmitted. As shown in FIG. 5, the illustrative cryptographic material layout 500 comprises a header 501 comprising a header length 502*a* (which may indicate the total words of the header), a blob type 502*b* (which may indicate, for example, whether the type of the included crypto-material is global or a field type secret), and encryption metadata 502*c* (which may indicate a length, a version of the metadata schema that might be updated when the schema is updated, an encoding such as JSON and/or YAML, and information about the encryption algorithm, data encryption key, parameters used during encryption, and the like). There is also padding 505 to make the header 501 equal to the length of an encrypted body 503, which may be desirable where the boxes in FIG. 5 represent binary sequence. For instance, the padding 505 may sized for efficiency to read binary into memory, essentially ensuring that the starting portion of the data is naturally aligned with CPU architecture, keeping in mind that the encrypted body 503 needs to also be read into memory for decryption. The encrypted body 503 comprises a manifest 504*a* (which may comprise information such as a length, a type of a manifest, a schema version, an encoding version, and an encoded manifest), a cryptographic blob array 504*b* (discussed below with respect to FIG. 6), and a signature 504*c* (which may contain information about the length, algorithm(s) used, and data used to verify the signing of the blob).

Figure 6:
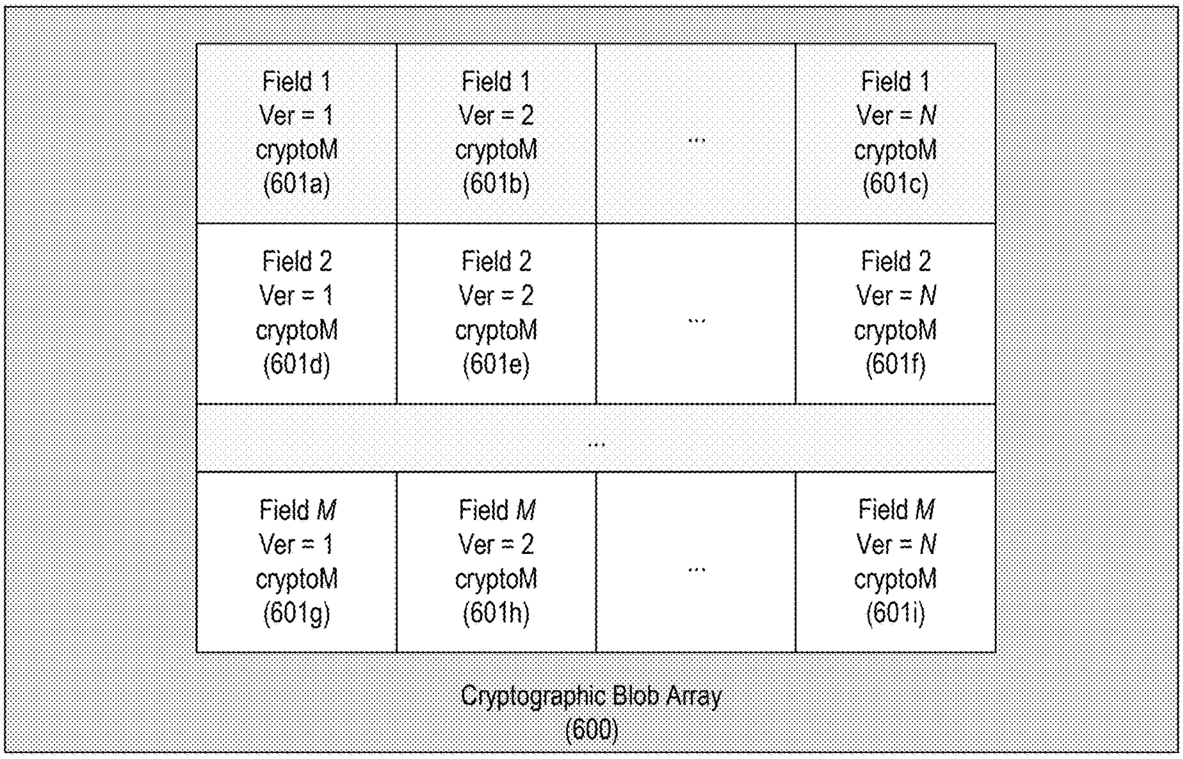
FIG. 6 depicts an illustrative cryptographic blob array layout.

FIG. 6 depicts an illustrative cryptographic blob array layout 600. The illustrative cryptographic blob array layout 600 might be all or portions of the cryptographic blob array 504*b* of FIG. 5. In other words, the illustrative cryptographic blob array layout 600 might comprise all of the cryptographic blobs that are part of the cryptographic materials depicted in FIG. 5. The illustrative cryptographic blob array layout 600 is shown as a grid of different cryptographic blobs, each corresponding to a different data field and algorithm version. More particularly, each row of the illustrative cryptographic blob array layout 600 depicts a different data field type (from 1 to field M), and each column represents a different version of the cryptographic blob (from 1 to version N). This includes a cryptographic blob 601*a* for a first field type and a first blob version, a cryptographic blob 601*b* for a first field type and a second blob version, all the way to a cryptographic blob 601*c* for a first field type and a blob having version N. This also includes a cryptographic blob 601*d* for a second field type and a first blob version, a cryptographic blob 601*e* for a second field type and a second blob version, all the way to a cryptographic blob 601*f* for a second field type and an blob having version N. This extends to a cryptographic blob 601*g* for a field type M and a first blob version, a cryptographic blob 601*h* for a field type M and a second blob version, all the way to a cryptographic blob 601*i* for a field type M and an blob having version N. Each of these blobs may comprise some amount of binary data (e.g., some sort of cryptographic secret) which may be usable by an algorithm (e.g., an encryption algorithm, a tokenization algorithm) to perform a function (e.g., encryption/tokenization). Each different version of the blob might have been generated as part of, for example, a periodic refresh of cryptographic material. For instance, for a system that refreshes cryptographic material daily based on a daily key rotation policy, the cryptographic blob 601*a* might have been generated on Monday, the cryptographic blob 601*b* may have been generated on Tuesday to supersede the cryptographic blob 601*a*, and so forth.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device for crypto-material life-cycle management, the computing device comprising:

one or more processors; and memory storing instructions that, when executed by the one or more processors, cause the computing device to:

generate cryptographic material comprising:

a header indicating parameters used to generate cryptographic blobs;
a first cryptographic blob for a first field type and a first tokenization algorithm; and
a second cryptographic blob for the first field type and the first tokenization algorithm;
receive, from a second computing device, a first cryptographic blob request that indicates:
a tokenization algorithm used by the second computing device; and
the first field type;
select, from the cryptographic material and based on the first cryptographic blob request, the first cryptographic blob;
send, to the second computing device and based on authenticating the second computing device, the selected first cryptographic blob;
receive, from the second computing device, a second cryptographic blob request that indicates:
the tokenization algorithm used by the second computing device; and
the first field type;
select, from the cryptographic material and based on the second cryptographic blob request, the second cryptographic blob;
send, to the second computing device and based on authenticating the second computing device, the selected second cryptographic blob;
generate, after sending the selected second cryptographic blob and based on the parameters used to generate the cryptographic blobs, new cryptographic material comprising:
the header; and
at least one third cryptographic blob for the first field type and the first tokenization algorithm.

2. The computing device of claim 1, wherein the cryptographic material comprises a fourth cryptographic blob for a second field type and the first tokenization algorithm, and wherein the instructions, when executed by the one or more processors, cause the computing device to:
receive, from the second computing device, a third cryptographic blob request that indicates:
the tokenization algorithm used by the second computing device; and
the second field type;
select, from the cryptographic material and based on the third cryptographic blob request, the fourth cryptographic blob; and
send, to the second computing device and based on authenticating the second computing device, the selected fourth cryptographic blob.

3. The computing device of claim 1, wherein the instructions, when executed by the one or more processors, cause the computing device to:
append, to the cryptographic material, one or more fourth cryptographic blobs for the first field type and a second tokenization algorithm;
receive, from the second computing device, a third cryptographic blob request that indicates:
the second tokenization algorithm; and
the first field type;
select, from the appended cryptographic material and based on the third cryptographic blob request, at least one of the one or more fourth cryptographic blobs; and
send, to the second computing device and based on authenticating the second computing device, the selected at least one of the one or more fourth cryptographic blobs.

4. The computing device of claim 1, wherein the instructions, when executed by the one or more processors, cause the computing device to:
based on determining that an age of the new cryptographic material satisfies a threshold:
generate, based on the parameters used to generate the cryptographic blobs, second new cryptographic material comprising:
the header; and
at least one fourth cryptographic blob for the first field type and the first tokenization algorithm.

5. The computing device of claim 1, wherein the instructions, when executed by the one or more processors, cause the computing device to send the selected first cryptographic blob by causing the computing device to:
cause obfuscation of the selected first cryptographic blob.

6. The computing device of claim 1, wherein the instructions, when executed by the one or more processors, cause the computing device to send the selected first cryptographic blob by causing the computing device to:
based on receiving data indicating a security breach associated with the second computing device:
generate, based on new parameters, second new cryptographic material comprising:
a second header indicating the new parameters; and
at least one fourth cryptographic blob for the first field type and the first tokenization algorithm.

7. The computing device of claim 1, wherein the header further indicates one or more of:
a version of a schema of the cryptographic material;
an encoding of the cryptographic material;
a quantity of fields supported by the cryptographic material; or
a quantity of versions of the tokenization algorithm supported by the cryptographic material.

8. A method for crypto-material life-cycle management, the method comprising:
generating, by a computing device, cryptographic material comprising:
a header indicating parameters used to generate cryptographic blobs;
a first cryptographic blob for a first field type and a first tokenization algorithm; and
a second cryptographic blob for the first field type and the first tokenization algorithm;
receiving, from a second computing device, a first cryptographic blob request that indicates:
a tokenization algorithm used by the second computing device; and
the first field type;
selecting, from the cryptographic material and based on the first cryptographic blob request, the first cryptographic blob;
sending, to the second computing device and based on authenticating the second computing device, the selected first cryptographic blob;
receiving, from the second computing device, a second cryptographic blob request that indicates:
the tokenization algorithm used by the second computing device; and
the first field type;

selecting, from the cryptographic material and based on the second cryptographic blob request, the second cryptographic blob;

sending, to the second computing device and based on authenticating the second computing device, the selected second cryptographic blob;

generating, after sending the selected second cryptographic blob and based on the parameters used to generate the cryptographic blobs, new cryptographic material comprising:

the header; and at least one third cryptographic blob for the first field type and the first tokenization algorithm.

9. The method of claim 8, wherein the cryptographic material comprises a fourth cryptographic blob for a second field type and the first tokenization algorithm, and wherein the method further comprises:

receiving, from the second computing device, a third cryptographic blob request that indicates:

the tokenization algorithm used by the second computing device; and the second field type;

selecting, from the cryptographic material and based on the third cryptographic blob request, the fourth cryptographic blob; and sending, to the second computing device and based on authenticating the second computing device, the selected fourth cryptographic blob.

10. The method of claim 8, further comprising:

appending, to the cryptographic material, one or more fourth cryptographic blobs for the first field type and a second tokenization algorithm;

receiving, from the second computing device, a third cryptographic blob request that indicates:

the second tokenization algorithm; and the first field type;

selecting, from the appended cryptographic material and based on the third cryptographic blob request, at least one of the one or more fourth cryptographic blobs; and sending, to the second computing device and based on authenticating the second computing device, the selected at least one of the one or more fourth cryptographic blobs.

11. The method of claim 8, further comprising:

based on determining that an age of the new cryptographic material satisfies a threshold:

generating, based on the parameters used to generate the cryptographic blobs, second new cryptographic material comprising:

the header; and at least one fourth cryptographic blob for the first field type and the first tokenization algorithm.

12. The method of claim 8, wherein the sending the selected first cryptographic blob comprises:

causing obfuscation of the selected first cryptographic blob.

13. The method of claim 8, wherein the sending the selected first cryptographic blob comprises:

based on receiving data indicating a security breach associated with the second computing device:

generating, based on new parameters, second new cryptographic material comprising:

a second header indicating the new parameters; and at least one fourth cryptographic blob for the first field type and the first tokenization algorithm.

14. The method of claim 8, wherein the header further indicates one or more of:

a version of a schema of the cryptographic material;

an encoding of the cryptographic material;

a quantity of fields supported by the cryptographic material; or a quantity of versions of the tokenization algorithm supported by the cryptographic material.

15. One or more non-transitory computer-readable media storing instructions that, when executed by one or more processors of a computing device, cause the computing device to:

generate cryptographic material comprising:

a header indicating parameters used to generate cryptographic blobs;

a first cryptographic blob for a first field type and a first tokenization algorithm; and a second cryptographic blob for the first field type and the first tokenization algorithm;

receive, from a second computing device, a first cryptographic blob request that indicates:

a tokenization algorithm used by the second computing device; and the first field type;

select, from the cryptographic material and based on the first cryptographic blob request, the first cryptographic blob;

send, to the second computing device and based on authenticating the second computing device, the selected first cryptographic blob;

receive, from the second computing device, a second cryptographic blob request that indicates:

the tokenization algorithm used by the second computing device; and the first field type;

select, from the cryptographic material and based on the second cryptographic blob request, the second cryptographic blob;

send, to the second computing device and based on authenticating the second computing device, the selected second cryptographic blob;

generate, after sending the selected second cryptographic blob and based on the parameters used to generate the cryptographic blobs, new cryptographic material comprising:

the header; and at least one third cryptographic blob for the first field type and the first tokenization algorithm.

16. The one or more non-transitory computer-readable media of claim 15, wherein the cryptographic material comprises a fourth cryptographic blob for a second field type and the first tokenization algorithm, and wherein the instructions, when executed by the one or more processors, cause the computing device to:

receive, from the second computing device, a third cryptographic blob request that indicates:

the tokenization algorithm used by the second computing device; and the second field type;

select, from the cryptographic material and based on the third cryptographic blob request, the fourth cryptographic blob; and send, to the second computing device and based on authenticating the second computing device, the selected fourth cryptographic blob.

17. The one or more non-transitory computer-readable media of claim 15, wherein the instructions, when executed by the one or more processors, cause the computing device to:

append, to the cryptographic material, one or more fourth cryptographic blobs for the first field type and a second tokenization algorithm;

receive, from the second computing device, a third cryptographic blob request that indicates:

the second tokenization algorithm; and the first field type;

select, from the appended cryptographic material and based on the third cryptographic blob request, at least one of the one or more fourth cryptographic blobs; and send, to the second computing device and based on authenticating the second computing device, the selected at least one of the one or more fourth cryptographic blobs.

18. The one or more non-transitory computer-readable media of claim 15, wherein the instructions, when executed by the one or more processors, cause the computing device to:

based on determining that an age of the new cryptographic material satisfies a threshold:

generate, based on the parameters used to generate the cryptographic blobs, second new cryptographic material comprising:

the header; and at least one fourth cryptographic blob for the first field type and the first tokenization algorithm.

19. The one or more non-transitory computer-readable media of claim 15, wherein the instructions, when executed by the one or more processors, cause the computing device to send the selected first cryptographic blob by causing the computing device to:

cause obfuscation of the selected first cryptographic blob.

20. The one or more non-transitory computer-readable media of claim 15, wherein the instructions, when executed by the one or more processors, cause the computing device to send the selected first cryptographic blob by causing the computing device to:

based on receiving data indicating a security breach associated with the second computing device:

generate, based on new parameters, second new cryptographic material comprising:

a second header indicating the new parameters; and at least one fourth cryptographic blob for the first field type and the first tokenization algorithm.

* * * * *